United States Patent [19]

Musschoot

[11] Patent Number: 5,131,525
[45] Date of Patent: Jul. 21, 1992

[54] VIBRATORY CONVEYOR

[75] Inventor: Albert Musschoot, Barrington, Ill.

[73] Assignee: General Kinematics Corporation, Barrington, Ill.

[21] Appl. No.: 707,267

[22] Filed: May 24, 1991

Related U.S. Application Data

[63] Continuation of Ser. No. 422,603, Oct. 17, 1989, abandoned.

[51] Int. Cl.$^5$ .............................................. B65G 27/20
[52] U.S. Cl. .................................... 198/770; 198/763
[58] Field of Search ............... 198/770, 766, 750, 764, 198/763; 221/200; 222/196, 199

[56] References Cited

U.S. PATENT DOCUMENTS

| | | | |
|---|---|---|---|
| 2,876,891 | 3/1959 | Long et al. | 198/763 |
| 2,951,581 | 9/1960 | Long et al. | 198/770 X |
| 3,604,555 | 9/1971 | Cowper | 198/770 X |
| 3,834,523 | 9/1974 | Evans | 198/763 |
| 3,882,996 | 5/1975 | Musschoot | 198/770 |
| 4,162,778 | 7/1979 | Kraft | 198/763 X |

FOREIGN PATENT DOCUMENTS

| | | | |
|---|---|---|---|
| 599119 | 5/1960 | Canada | 198/763 |
| 606585 | 10/1960 | Canada | 198/770 |
| 55-89118 | 7/1980 | Japan | 198/770 |
| 55-140409 | 11/1980 | Japan | 198/770 |
| 307950 | 9/1971 | U.S.S.R. | 198/770 |
| 828219 | 2/1960 | United Kingdom | 198/770 |

*Primary Examiner*—Robert P. Olszewski
*Assistant Examiner*—Cheryl L. Gastineau
*Attorney, Agent, or Firm*—Wood, Phillips, VanSanten, Hoffman & Ertel

[57] ABSTRACT

A vibratory conveyor is provided that has only horizontal conveying motion acting on material lying in the plane of an elongate trough. A vibration generating apparatus is positioned selectively between the ends of the conveying trough. The vibration generating apparatus can be repositioned to any desired location along the trough to take advantage of the improved conveying action and the reduced deflection and twisting of the trough. The vibration generating apparatus includes a driving motor using a flexible drive to power two pairs of counter-rotating eccentric weights, with one pair being driven at twice the speed of the other pair so as to provide a motion on the material that moves the material along the plane of the trough with virtually no vertical component relative to the plane of the trough.

20 Claims, 3 Drawing Sheets

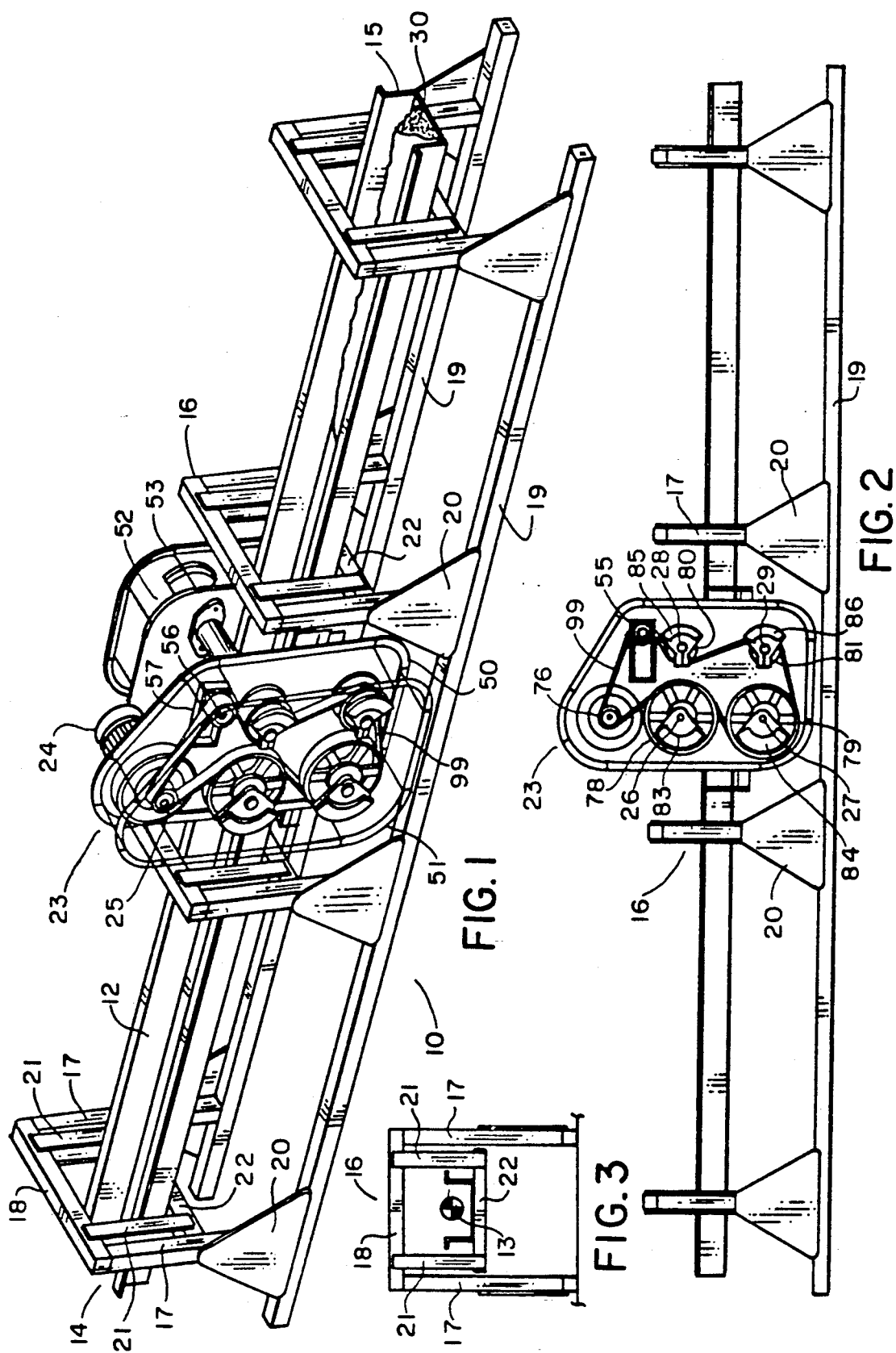

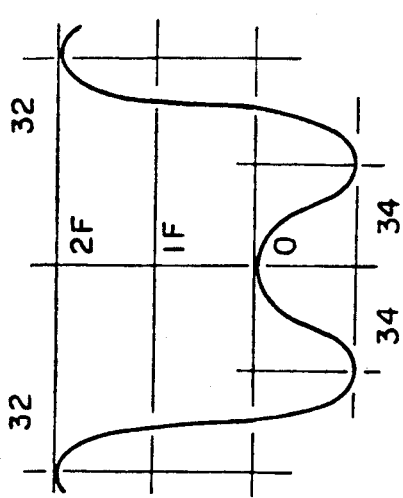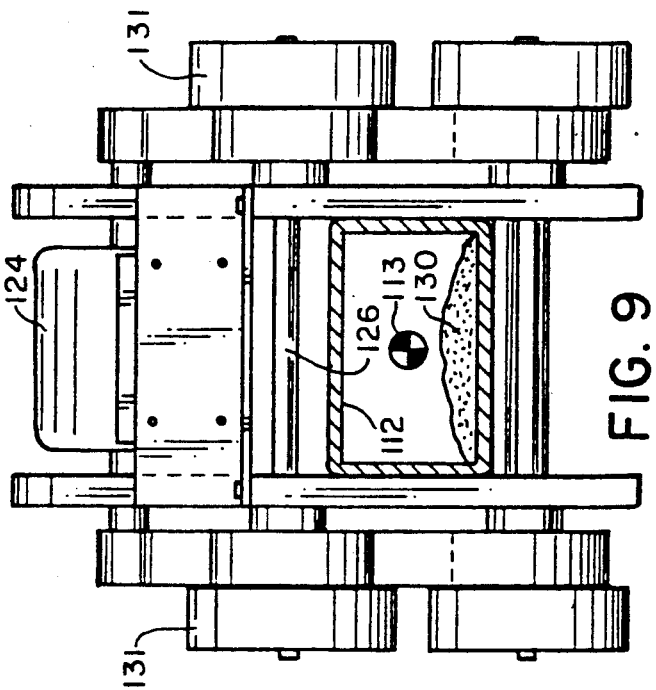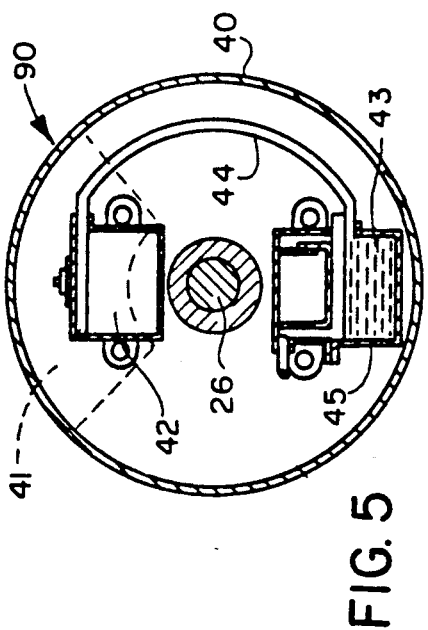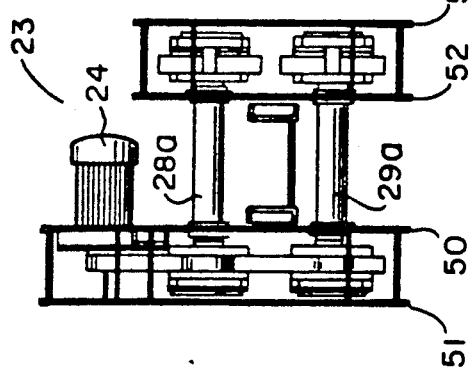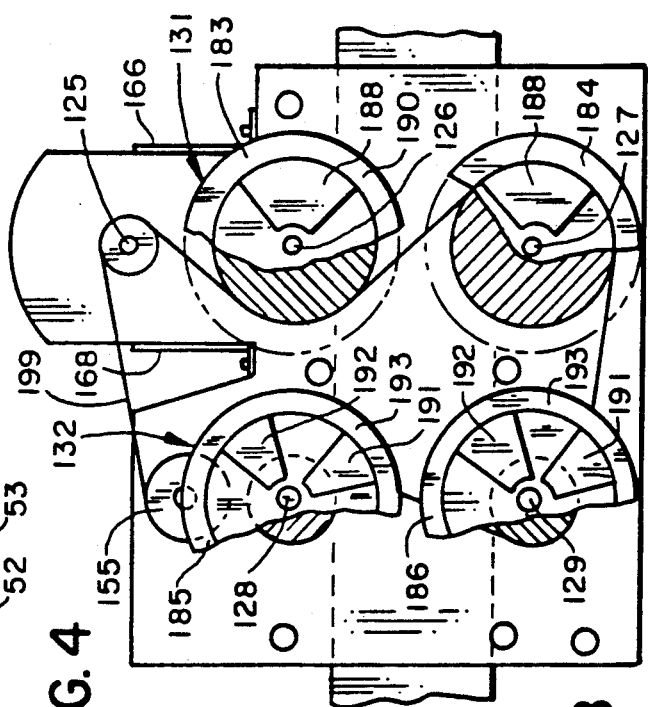

VIBRATORY CONVEYOR

This application is a continuation, of application Ser. No. 422,603, filed Oct. 17, 1989, now abandoned.

BACKGROUND OF THE INVENTION

1. Field of the Invention

This invention relates to vibratory conveyors and, in particular, to improved vibratory conveyors for moving a variety of materials without inducing a vertical component of motion.

2. Description of the Background Art

Vibratory conveyors have been known and used for many years. In the usual type of vibrator conveyor, the material-carrying trough vibrated at an angle to the horizontal normally of the order of 45 degrees. The material conveyed is, in effect, bounced along the trough from one end to the other to effect the conveying action. Thus, for much of the travel the material is airborne, striking the material-carrying surface only long enough to be relaunched into the air in the direction of the discharge end of the conveyor.

The existence of vertical force and motion components offered many disadvantages. Because of the bouncing nature of the conveying actions, it was difficult for a worker standing alongside the trough to actually perform any work on the articles being conveyed. Because of the vertical motion, light particulate materials would tend to float upon launching and provide extremely dusty work environments. Because of the requirement of exceeding the acceleration of gravity, conveyors were load sensitive and not easily adapted to moving materials of various weight. By the very nature of repeated impacts of the material with the trough, substantial noise was contributed to the conveyance process.

One known commercial device attempts to eliminate many of the problems of vibratory conveyors which make use of vertical force and motion components. The device has a geared vibratory means at the inlet end of the trough, causing the vibratory forces to weaken as the distance from the vibratory means increases, and extreme bending and deflection may occur in the trough as the length of the trough is increased. Because of the inability to reposition the vibratory means along the length of the trough, it is not possible to suppress such deflection. It is impossible to position the vibratory means along the length of the trough because due to the gear size required to attain the necessary conveyance rates, it is not possible to pass the material-carrying trough through the vibratory means, which instead would have to be positioned either above or below the trough, thereby inducing a force couple and generating large stresses within the trough. In an arrangement with the vibrating means at the extreme end of the trough, large inertial forces act in tension and compression at the interface of the trough with the vibration generating means, inducing large stresses which lead to material failure of the trough. Means are also lacking for controlling the magnitude of the vibratory forces imparted to the trough while the apparatus is in operation.

SUMMARY OF THE INVENTION

The present invention provides a vibratory conveyor where the conveying action is relatively smooth and thus the articles being conveyed appear to flow from one end of the conveyor to the other rather than to bounce therealong. The smooth flow is accomplished by applying a purely horizontal force to the trough and further by arranging the support means carrying the trough so as to permit the trough to move primarily horizontally with only a small, if any, vertical component. Thus, the motion of the trough is at an angle of close to 90 degrees from the vertical, or nearly horizontal The arrangement of the vibration generating means is such that the maximum horizontal vibratory forces applied to the trough in the direction of conveyance are less than the static friction force acting between the trough and the material. Thus, adherence is maintained between the material and the trough and the material is conveyed forward. The horizontal forces applied to the trough opposite to the direction of conveyance, such as in rebound of the trough, are such that the force of adherence is exceeded and the trough rebounds without returning the material to its original position. Such an arrangement permits a shuffling motion of the material being conveyed. Additionally, the rate at which the material is conveyed is increased because of the decreased lag time between consecutive propelling force impulses. Through the use of variable force producing vibratory apparatuses, it is possible to vary the magnitude of the vibratory force imparted from substantially zero to a maximum.

The apparatus can be used to convey powdery or dusty materials without creating a cloud of dust, can be used to convey hot or cold materials, can provide for visual and manual inspection and treatment of material while being conveyed, and the like.

One feature of the invention is the unique mounting of the vibration generating means on the material-carrying trough. The vibration generating means may be positioned anywhere along the trough in order to minimize the stresses with the trough as forces are being applied. Such an arrangement is capable of accommodating troughs of variable length. Another advantage of fixing the vibratory means to the trough is that because the forces generated by the vibration means are absorbed by the reactive motion of the trough, the system is inherently self-balanced and thus greatly reduces the reaction forces which must otherwise be absorbed.

Another feature of the invention is the manner in which the force producing eccentric vibrator shafts are positioned. As a result of being closely and symmetrically vertically spaced about the trough, bending and deflection of the trough is eliminated. Because weights are provided at each end of the vibratory shafts, a twisting moment acting about the vertical axis is eliminated. This is a particularly important feature in very wide conveyors where heretofore substantial dynamic forces were imparted to the trough and transmitted to the base, and thus required a much heavier construction.

DESCRIPTION OF THE DRAWINGS

FIG. 1 is a perspective view of a preferred embodiment of the features of the invention;

FIG. 2 is a side view of the invention shown in FIG. 1;

FIG. 3 is an end view of the material-carrying means of the invention shown in FIG. 1;

FIG. 4 is an end view of the vibratory means of the invention shown in FIG. 1;

FIG. 5 is a variable force vibratory generating apparatus illustrating an alternative structure for the invention;

FIG. 6 is an illustration of the resultant forcing function generated by the vibratory means contained within the invention;

FIG. 8 is an enlarged side view of FIG. 7 showing the arrangement of the vibratory shafts;

FIG. 9 is an sectional view of the invention shown in FIG. 7;

DESCRIPTION OF THE PREFERRED EMBODIMENT

Figures 7, 7A:
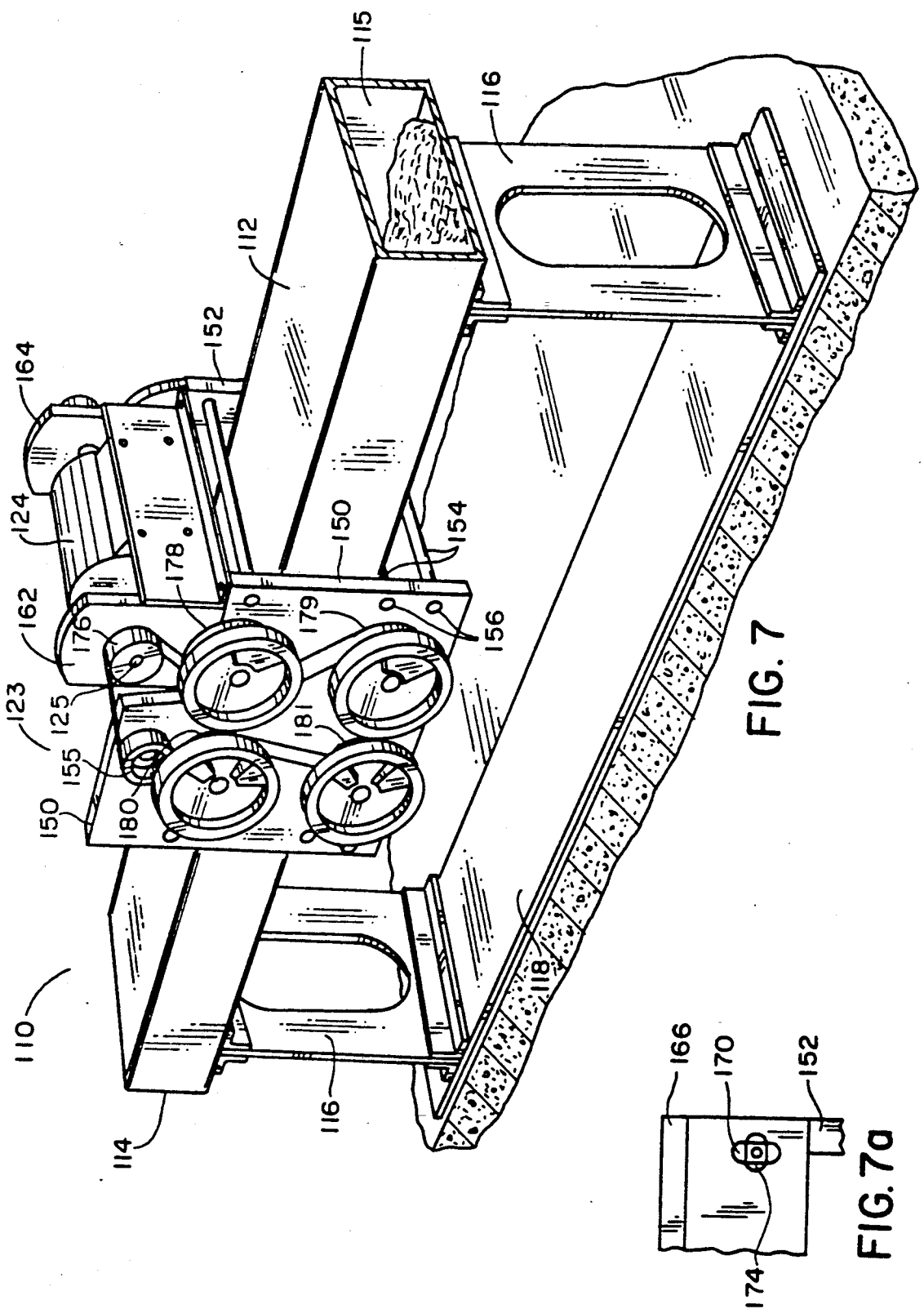
FIG. 7 is a perspective view of a second embodiment of the invention.
FIG. 7A is a partial plan view along lines 7a-7a of FIG. 7 showing the adjusting structure for the motor mounting.

FIGS. 1-6 of the drawings illustrate a preferred embodiment of the invention. Referring now to FIG. 1, there is shown a vibratory conveyor 10 having a material-carrying member in the form of a trough 12. The trough is elongated from an entrance end 14 at the left-hand end thereof (as seen in FIG. 1), which end receives material from a delivery conveyor (not shown) to a discharge end 15 where the material exits to additional equipment for further processing, packaging or the like. The trough is shown open but it is to be understood that the trough could be closed for appropriate containment of the material being conveyed. The trough 12 has a center of gravity 13, whose position in an end view of the trough is determined by the cross-sectional geometry of the trough 12.

The trough 12 is resiliently suspended from an overhead support structure 16, said support structures 16 comprising plural pairs of longitudinally spaced vertical legs 17, with each pair of legs connected by horizontal cross members 18, and longitudinal base members 19. The vertical legs 17 are attached at one end to either end of the cross members 18, and attached at the other end to the base members 19. Gusset plates 20 support the vertical legs in an upward stable relationship. The trough 12 is suspended from the overhead structures 16 by means of vertical straps 21. The straps 21 are attached at one end to the horizontal cross members 18 and at the other end to trough support members 22. The vertical straps 21 are positioned on each side of the trough 12, thereby cooperating with the trough support members 22 to define a stable support platform for the trough 12. Because the straps 21 are constructed of a dimension in the direction transverse to the path of conveyance much larger than that of the direction parallel to the path of conveyance, the vertical straps 21 are thereby caused to act as resilient means of a leaf-spring type permitting displacement of the trough only in the direction of conveyance. The horizontal deflection of the bottoms of the straps 21 combine with the forces imparted by a vibration generating apparatus 120 to create motion of the trough 112 in a substantially horizontal direction with very little vertical deflection The vibration generating apparatus 23 is either permanently affixed to the trough at a preselected location along the length of the trough or is removably attached to the trough so that it can be moved to any desired location along the length of the trough. The vibration generating apparatus 23 is comprised of a pair of sideplates 50,52 secured together and secured to the trough 12. The motor 24 is supported on the apparatus 23 by bolting the motor to the sideplate 50. The motor has a shaft 25 extending through the sideplate 50. A toothed drive pulley 76 is attached to the end of the shaft 25 on the outside of the sideplate 50. Sealed housing structures 51,53 are connected to sideplates 50,52 respectively, to ensure a sanitary environment for the conveyance process. An adjustable idler pulley 55 is mounted adjacent the motor mount and includes a stub shaft 56 mounted on a horizontally adjustable plate 57. The shaft supports the pulley in alignment with the drive pulley 76 on the motor.

Four shafts 26,27,28,29 are mounted parallel with each other and are rotatably supported between the sideplates 50 and 52. An idler pulley 55 is toothed and lies in parallel plane common with the plane of the drive pulley 76. The four shafts 26,27,28,29, which extend between the sideplates 50,52 are vibratory shafts and are located above and below the trough in relatively close proximity to the top and bottom surfaces of the trough so as to minimize bending stresses on the trough. The shafts 26,27,28,29 are carried within cylindrical housings 26a,27a,28a,29a to further ensure a sanitary conveyance environment. On each end portion of each shaft 26,27,28,29 is affixed a toothed pulley 78, 79, 80, and 81, respectively, and an eccentric weight structure 83, 84, 85, and 86, respectively. Outside the sideplate 50 is routed a timing belt 99 around the drive pulley 76, pulley 78, pulley 79, pulley 80, pulley 81 and idler pulley 55 and back to the drive pulley 76. The routing of the timing belt 99 is in a preferred pattern to produce a desired result which will become apparent as this description proceeds.

Each of the vibratory shafts 26,27,28,29 carries eccentric weight structures 83,84,85,86. In one preferred form, the eccentric structures would be variable force structures such as shown in FIG. 5, which figure is from applicant's issued U.S. Pat. No. 3,358,815, whereby the vibratory force may be varied from substantially zero to a maximum. Thus, the amplitude of the movement of the trough may be varied from a remote location to produce the desired flow characteristics of the material being conveyed by the trough. The variable force structure 90 of FIG. 5 includes a cylindrical housing 40 rotatable by a shaft 26. A fixed weight 41 is carried by the housing 40. In the housing are two chambers 42 and 43 connected by a conduit 44. An appropriate fluid 45 is disposed in chamber 43 and has sufficient weight to offset the fixed weight 41, resulting in a balanced housing and no vibratory motion being generated upon rotation of the housing. This condition is ideal for startup since the lack of unbalanced forces reduces the load on the motor. When the housing 40 is up to speed, the fluid in chamber 43 is gradually forced into chamber 42 creating gradually increasing unbalance and increasing vibratory motion. Details of the structure and operation of this and other variable force vibratory generating apparatus are shown in U.S. Pat. No. 3,358,815 and other U.S. patents of the inventor, Albert Musschoot (see U.S. Pat. No. 4,495,826). A variable force member 90 may be mounted on each end of each shaft 26,27,28,29, with the fixed weights oriented as in FIG. 2, that is, for example, the fixed weight 44 is in the 90° position of FIG. 2, and the movable weight 43 is on the 270° position of FIG. 2, so that, at startup, there is no unbalance in the apparatus. Thereafter, varying the forces in the housings will produce the same effect as using the fixed weights 83,84,85,86 of FIG. 2.

As shown in FIG. 1, the vibration generating apparatus 23 is selectably positioned at a point anywhere along the trough 12. As a result, it is possible to suppress the deflection and beam bending effects of the trough 12 which exist in systems in which vibratory forces are imparted to a trough at the extreme end. Additionally, because the vibration generating apparatus 23 are fixed to the trough 12, reactive forces of the vibratory means 23 are absorbed by the movement of the trough 12 and do not need to be absorbed with costly support structure.

Referring to FIG. 2, the vibratory shafts 26,27 are two half-speed shafts and vibratory shafts 28,29 are two full-speed shafts. The half-speed shafts 26,27 each carry eccentric weights 83,84 at each end. Each of the full-speed shafts 28,29 carry eccentric weights 85,86 at each end.

As shown in FIG. 2, the points at which the belt means 99 make contact with the pulleys 80,81 carried by the full-speed shafts 28,29 are at a distance from the axis of rotation equivalent to one-half of the distance between the axis of rotation of half-speed shafts 26,27 and the point at which belt means 99 make contact therewith. Such an arrange arrangement permits the belt means 99 to drive the half-speed shafts 26,27 at an angular rate equivalent to one-half of the angular rate of the full-speed shafts 28,29.

As further shown in FIG. 2, the vibratory shafts 26,27,28,29 are arranged such that belt means 99 will act to rotate each of half-speed shafts 26,27 and full-speed shafts 28,29, respectively, in a counter-rotating manner. In the preferred embodiment, each of the vibratory shafts 26,27,28, and 29 are at one instant synchronized such that, as illustrated in FIG. 2, each of eccentric weights 83,84 are positioned at 0 degrees from the horizontal while each of weights 85,86 are also positioned at 0 from the horizontal, however the weights 85,86 are positioned 180 degrees out of phase with the weights 83,84 of the full speed shafts 26,27. Because of this arrangement, the vertical forces generated by any pair of vibratory shafts 26,27,28,29 will always be cancelled by the opposing forces generated by the corresponding remaining pair of shafts. Additionally, this arrangement allows the generation of preferred horizontal force characteristics.

In the arrangement shown in FIG. 4, it can be seen that each of the vibratory shafts 26,27,28,29 carries pulleys and eccentric weights at each end thereof. As a result of this arrangement, horizontal forces are generated at each side of the trough 12, thus eliminating the twisting moment of the shafts 26,27,28,29 about a vertical axis which would exist if the horizontal forces were imparted only along one edge of the trough 12. Because the shafts 26,27,28,29 are closely spaced about the trough 12, and the eccentric weights 83,84,85,86 are symmetrically positioned along each edge of the trough 12, the resultant horizontal force generated thereby will continuously act substantially through the center of gravity 13.

During the oscillatory motion of the trough 12, the material 30 adheres to the surface 13 of the trough 12 as a result of static friction. While the propelling horizontal force accelerates the trough 12 and thus the material 30 at a rate less than the critical value defined by the counteracting effects of static friction, the material 30 follows the displacement of the trough 12 and is thus conveyed. In order to return the trough 12 to its initial position for subsequent conveyance, a horizontal force must be imparted to the trough 12. In order to prevent the material 30 from following the return displacement of the trough 12, the horizontal force which is imparted must accelerate the trough 12 at a rate sufficient to exceed the frictional force of adherence acting at the interface of the trough surface 13 and the material 30. In this way, a slip would occur resulting in relative displacement of the material 30 in relation to the trough 12.

The graph shown in FIG. 6 illustrates one cycle of the periodic resultant horizontal forcing function generated as a result of the synchronization of the unbalanced rotors in the preferred embodiment. FIG. 6 shows the magnitude of the resultant force as a function of the angular displacement of the vibratory shafts 26,27,28,29. Each horizontal division on the graph of FIG. 6 represents 90 degrees of rotation of the half-speed shafts 26,27, or correspondingly, 180 degrees of rotation of the full-speed shafts 28,29. It can be seen that due to the relative rates of rotation of vibratory shafts 26,27 and 28,29, the resultant horizontal forces generated reach a peak value 32 in one direction which is two times as great as the magnitude of the force 34 generated in the opposite direction. Assumably, the direction in which the larger force is applied would be opposite the preferred direction of conveyance, and, as such, may be thought of as a return force. The direction in which the smaller force is applied would be the preferred direction of conveyance. By appropriately prescribing the absolute value corresponding to the peak values 32 and 34, it is possible to generate forces consistent with the previously described convey/slip arrangement.

In an exemplary set of conditions, the eccentric weights supported by the half-speed shafts 26,27 and the full-speed shafts 28,29 are at one instant synchronized such that each of the half-speed shafts 26,27 and each of the full-speed shafts 28,29 develops a force of F/2 in the direction opposite the direction of conveyance, thus generating a resultant force of 2F. When each of the counter-rotating half-speed shafts 26,27 have rotated 90 degrees, the half-speed shafts 28,29 generate no force in the direction of conveyance, while the full-speed shafts 28,29, having rotated 180 degrees, together produce a resultant force of F in the direction of conveyance.

When each of the half-speed shafts 26,27 have rotated 180 degrees from the synchronous initial condition, the eccentric weights supported therein together produce a force of F in the direction of conveyance, while the full-speed shafts 28,29, having rotated 360 degrees, together produce a force of F in the direction opposite the direction of conveyance, which cancels the force generated by the half-speed shafts 26,27, establishing a resultant force of zero.

When each of the half-speed shafts 26,27 have rotated 270 degrees from the synchronous initial condition, the eccentric weights supported therein produce no force in the direction of conveyance, while the full-speed shafts 28,29, having rotated 540 degrees or the equivalent of 180 degrees, together act to produce a resultant force of F in the direction of conveyance.

When each of the half-speed shafts 26,27 have rotated 360 degrees, each of the half-speed shafts 26,27 and the full-speed shafts 28,29 (having rotated 720 degrees) are again synchronized such that a resultant force of 2F is generated in the direction opposite the direction of conveyance.

It can additionally be seen from FIG. 6 that the conveying force 34 is generated twice between each occurrence of the return force 32. Thus, for each cycle of the forcing function, the trough 12 and therefore material 30 are subject to a cumulative force of conveyance equal to twice the magnitude of the force 32, but because the individual force impulses accelerate the trough 12 at a rate less than the critical value required for relative slip, the material 30 maintains adherence with the trough surface.

It should be understood that while the present disclosure is adapted to material conveyance of a purely horizontal nature, the fundamental concepts may be logically extended to encompass an inclined orientation of the material-carrying trough in which vibratory forces act exclusively in the plane defined by the trough. In this arrangement, no force or motion components would be generated perpendicular to the trough and the material would be similarly conveyed in the direction of the trough.

FIGS. 7-9 of the drawings illustrate an alternate embodiment of the invention. Referring now to FIG. 7, there is shown a vibratory conveyor 110 having a material-carrying member in the form of a trough 112. The trough is elongated from an entrance end 114 at the left-hand end thereof (as seen in FIG. 7), which end receives material from a delivery conveyor (not shown) to a discharge end 115 where the material exits to additional equipment for further processing, packaging or the like. The trough is shown closed but it is to be understood that the trough could be open on the top for visual and manual access to the material being conveyed. The trough 112 has a center of gravity 113, whose position in an end view of the trough is determined by the cross-sectional geometry of the trough 112.

The trough 112 is carried by a plurality of vertical legs 116, only two being shown, attached at one end to the underside of the trough 112 and at the other end to a mounting surface 118. Because the legs are constructed of a dimension in the direction transverse to the path of conveyance much larger than that of the direction parallel to the path of conveyance, the legs are thereby caused to act as resilient means of a leaf-spring type permitting displacement of the trough only in the direction of conveyance. The horizontal deflection of the tops of the legs 16 combine with the forces imparted by a vibration generating apparatus 123 to create motion of the trough 112 in a substantially horizontal direction with very little vertical deflection.

The vibration generating apparatus 123 is either permanently affixed to the trough at a preselected location along the length of the trough or is removably attached to the trough so that it can be moved to any desired location along the length of the trough. The vibration generating apparatus 123 is comprised of a pair of sideplates 150,152 secured together and secured to the trough 112 by plural tie rods 154 extending between the plates both above and below the trough. Nuts 156 are threaded on the ends of the rods 154. In one preferred form of the invention, the tie rods are loosened and the apparatus 123 is moved to a desired location along the length of the trough.

A motor support structure 158 has a base 150, upstanding end members 162,164 and side members 166,168 extending between the end members 162,164. The base 160 extends beyond the two upstanding side members and has elongate slots 170 adjacent to and overlapping the top surfaces of the sideplates 150,152. Studs 172 extend upward from the sideplates 150,152 and pass through the slots 170. Nuts 174 are threaded on the studs. With the nuts 174 loosened, it is possible to move the support structure and a motor 124 carried thereby along the length of the sideplates 150,152 for a purpose to be described hereinafter. The motor 124 is supported on the support structure by bolting the motor either to the base 160 or to the side members 166,168. The motor has a double-ended shaft 125 extending through the end members 162,164. Toothed drive pulleys 176 are attached to the opposite ends of the shaft 125 on the outside of the sideplates 162,164.

Five shafts 126,127,128,129 and 177 are mounted parallel with each other and are rotatably supported between the sideplates 150 and 152. One shaft 177 supports an idler pulleys 182 on opposite ends thereof. The idler pulleys 155 are toothed and lie in parallel planes common with the planes of the drive pulleys 176. The four shafts 126,127,128,129, which extend between the sideplates 150,152 are vibratory shafts and are located above and below the trough in relatively close proximity to the top and bottom surfaces of the trough so as to minimize bending stresses on the trough. On each end portion of each shaft 126,127,128,129 is affixed a toothed pulley 178, 179, 180, and 181, respectively, and an eccentric weight structure 183, 184, 185, and 186, respectively. Outside each sideplate 150 and 152 is routed a timing belt 199 around the drive pulley 176, pulley 178, pulley 179, pulley 180, pulley 181 and idler pulley 155 and back to the drive pulley 176. The routing of the timing belts 199 is in a preferred pattern to produce a desired result which will become apparent as this description proceeds. The timing belts 199 are tensioned by loosening the nuts 174 and shifting the motor support structure, motor 124 and drive pulleys relative to the sideplates 150,152 until the desired tension is obtained, whereupon the nuts are again tightened.

Each of the vibratory shafts 126,127,128,129 carries eccentric weight structures 183,184,185,186 which, in the simplest form, are rotors 131 having eccentric weights 188 in rings 190 forming eccentric structures 183,184 and rotors 132 having eccentric weights 191,192 in rings 193 forming eccentric structures 185,186.

As shown in FIG. 7, the vibration generating apparatus 123 is selectably positioned at a point anywhere along the trough 112. As a result, it is possible to suppress the deflection and beam bending effects of the trough 112 which exist in systems in which vibratory forces are imparted to a trough at the extreme end. Additionally, because the vibration generating apparatus 123 are fixed to the trough 112, reactive forces of the vibratory means 13 are absorbed by the movement of the trough 112 and do not need to be absorbed with costly support structure.

Referring to FIGS. 8 and 9, the vibratory shafts 126,127 are two half-speed shafts and vibratory shafts 128,129 are two full-speed shafts. The half-speed shafts 126,127 each carry unbalanced rotors 131 at each end. The rotors 131 comprise an outer disk, or ring 191 and a fixed eccentric weight 188. Each of the full-speed shafts 128,129 carry unbalanced rotors 132 at each end. The rotors 132 comprise an outer disk, or ring, 193 and a pair of fixed eccentric weights 191 and 192.

As shown in FIG. 8, the weights 191 and 192 are positioned within disk or ring 193 of the rotors 132 at equivalent distances from the axis of the full-speed shafts 128,129, and are angularly spaced 190 degrees apart. The points at which the belt means 199 make contact with the pulleys 180,181 carried by the full-speed shafts 128,129 are at a distance from the axis of rotation equivalent to one-half of the distance between the axis of rotation of half-speed shafts 126,127 and the point at which belt means 199 make contact therewith. Such an arrangement permits the belt means 199 to drive the half-speed shafts 126,127 at an angular rate equivalent to one-half of the angular rate of the full-speed shafts 128,129.

The operation of the second embodiment is substantially the same as the operation of the first embodiment with material being moved horizontally along the trough without any meaningful movement perpendicular to the trough.

I claim:

1. A vibratory conveyor comprising:
   an elongated material-carrying member;
   vibration generating means mounted on said material-carrying member intermediate the ends thereof for imparting horizontal vibratory forces to said material-carrying member, said vibration generating means being selectably mounted along the length of said material-carrying member;
   means for driving said vibration generating means; and
   means for supporting said material-carrying member for oscillatory movement relative to a fixed mounting structure, said support means including overhead suspension means comprising a plurality of pairs of longitudinally spaced vertical legs extending from a base member, a horizontal cross member joining each pair of vertical legs, spaced apart vertical strap means depending from at least two of said cross members, said strap means cooperating with horizontal support members to provide a stable material-carrying member support platform, and wherein said material-carrying member may be fixed to said support member and carried for substantially horizontal oscillation therein.

2. A vibrating conveyor as claimed in claim 1 wherein said vibration generating means includes a plurality of vibrator shafts operatively driven by a motor, two of said shafts being driven opposite directions and being half-speed shafts with weights which are synchronized, and two of said shafts being driven in opposite directions and being full-speed shafts with weights which are synchronized, the half-speed shafts and full-speed shafts being synchronized so that in one position a double force is operating in one direction and during continued rotation of the shafts two single forces will operate successively in the opposite direction of the double forces so as to shuffle material on the material-carrying in one direction.

3. A vibratory conveyor as claimed in claim 1 wherein said means for driving said vibration generating means is a motor mounted in close proximity to said vibration generating means, and wherein a belt drive connects said motor to said vibration generating means.

4. A vibratory conveyor comprising:
   an elongated material-carrying member;
   means for supportively mounting said material-carrying member for horizontal oscillatory movement relative to a mounting surface, said mounting means comprising a plurality of longitudinally spaced legs extending from said material-carrying member to said mounting surface at an angle of approximately 90 degrees with the horizontal, and wherein said mounting means resiliently tolerate horizontal movement of said material-carrying member relative to said mounting surface while substantially restricting vertical movement of said material-carrying member; and
   vibration generating means mounted on said material-carrying member intermediate the ends thereof for imparting horizontal vibratory forces to said material-carrying member, said vibration generating means being selectively mounted along the length of said material-carrying member, said vibration generating means comprising vibrator shafts located above and below the material-carrying member; and
   means for driving said vibration generating means.

5. A vibratory conveyor comprising:
   an elongated material-carrying member;
   overhead suspension means for supporting said material-carrying member relative to a fixed mounting surface, said suspension means constraining said material-carrying member for movement substantially parallel with said mounting surface;
   vibration generating means carried by said material-carrying member for imparting vibratory forces to said material-carrying member in a plane substantially parallel with said mounting surface and at a point selectably along the path of conveyance, said vibration generating means comprising vibrator shafts located above and below the material-carrying member, said material-carrying member having a center of gravity; and
   means for directing said vibratory forces generated by said vibration generating means along a linear path substantially parallel with said mounting surface and closely aligned with said center of gravity of said material-carrying member.

6. A vibratory conveyor as claimed in claim 5 wherein said vibration generating means comprises force producing means including eccentrically mounted weights disposed in axial opposition on each of said plurality of vibrator shafts, said vibrator shafts being mounted on parallel axes extending generally perpendicular to the direction of substantially parallel oscillating movement of said material-carrying member relative to said mounting surface, said vibrator shafts being disposed in closely spaced relation to said material-carrying member.

7. A vibratory conveyor comprising:
   an elongated material-carrying member;
   overhead suspension means for supporting said material-carrying member relative to a fixed mounting surface, said suspension means supporting said material-carrying member for substantially horizontal movement;
   vibration generating means carried by said material-carrying member for imparting horizontal vibratory forces to said material-carrying member in a plane substantially parallel with said mounting surface and at a point selectably along the path of conveyance, said material-carrying member having a center of gravity;
   means for directing said vibratory forces generated by said vibration generating means along a linear path closely aligned with said center of gravity of said material-carrying member;
   said vibration generating means comprises force producing means including eccentrically mounted weights disposed in axial opposition on each of a plurality of vibrator shafts, said vibrator shafts being mounted on parallel axes extending generally perpendicular to the direction of generally horizontal oscillating movement of said material-carrying member, said vibrator shafts being disposed in closely spaced relation to said material-carrying member, said vibrator shafts located both above and below said material-carrying member, said vibration generating producing means produces force components acting in vertical and lateral symmetry with respect to said center of gravity of said material-carrying member, said force components defining a resultant force which is directed so as to act through said center of gravity of said material-carrying member.

8. A vibratory conveyor as claimed in claim 7 wherein said vibrator shafts are configured such that said eccentrically mounted weights thereon together produce a varying horizontal resultant force with a peak magnitude less than or equal to the magnitude of the frictional force existing between said material-carrying member and the material being conveyed while acting in the direction in which said material is being conveyed, and such that said eccentrically mounted weights thereon together produce a varying resultant horizontal force with a peak magnitude greater than the magnitude of said frictional force while acting in the direction opposite of that in which said material is being conveyed.

9. A vibratory conveyor comprising:
an elongated material-carrying member;
overhead suspension means for supporting said material-carrying member relative to a fixed mounting surface, said suspension means supporting said material-carrying member for substantially horizontal movement;
vibration generating means carried by said material-carrying member for imparting horizontal vibratory forces to said material-carrying member in a plane substantially parallel with said mounting surface and at a point selectably along the path of conveyance, said material-carrying member having a center of gravity;
means for directing said vibratory forces generated by said vibration generating means along a linear path closely aligned with said center of gravity of said material-carrying member;
said vibration generating means comprising force producing means including eccentrically mounted weights disposed in axial opposition on each of a plurality of vibrator shafts, said vibrator shafts being mounted on parallel axes extending generally perpendicular to the direction of generally horizontal oscillating movement of said material-carrying member, said vibrator shafts being disposed in closely spaced relation to said material-carrying member, said vibrator shafts being configured such that said eccentrically mounted weights thereon together always produce equal but opposite vertical force components that cancel during a three hundred sixty degree rotation of said vibrator shafts, said vibration generating producing means produces force components acting in vertical and lateral symmetry with respect to said center of gravity of said material-carrying member, said force components defining a resultant force which is directed so as to act through said center of gravity of said material-carrying member.

10. A vibratory conveyor comprising:
an elongated material-carrying member;
overhead suspension means for resiliently mounting said material-carrying member relative to a fixed mounting structure; and
vibration generating means longitudinally disposable and mounted on said material-carrying member for imparting vibratory forces to said material-carrying member at a point selectably along the path of conveyance, said vibration generating means including a motor and a plurality of independent vibrator shafts operatively associated with said motor, said vibrator shafts including force producing means associated therewith, said force producing means further comprising means for independently varying the respective magnitude of the resultant vibratory force generated by each of said force producing means, said vibratory force varying means comprises a plate supporting a fixed eccentric weight, and wherein said plate in radially spaced relation to said fixed eccentric weight by positioning means and being further stationarily disposed in angular relation to said fixed eccentric weight in a predetermined orientation.

11. A vibratory conveyor comprising:
an elongated material-carrying trough;
overhead suspension means for resiliently mounting said trough relative to a fixed mounting structure, said suspension means comprising at least two longitudinally spaced pairs of vertical legs extending from a base member, each pair of legs being joined by a horizontal cross member, and strap means depending from said cross members, said strap means cooperating with a trough support member to provide a stable trough platform; and
vibration generating means longitudinally disposable and mounted on said material-carrying member, said vibration generating means including a motor and a plurality of parallel independent vibrator shafts operatively associated with said vibrator motor, said vibrator shafts including two vertically spaced counter-rotating half-speed shafts each carrying a force producing means at each end thereof, said vibration generating means also including two vertically spaced counter-rotating full-speed shafts, said full speed shafts each carrying a force producing means at each end thereof, said full-speed shafts being driven at an angular rate equivalent to twice the angular rate of said half-speed shafts by means comprising a belt drive operatively associated with each of said force producing means, said belt drive means applying a rotational force to the half-speed shafts in spaced relation to the rotational axes of said full-speed shafts at a distance equivalent to twice that of said half-speed shafts.

12. A vibratory conveyor as claimed in 11 wherein said force producing means supported by said half-speed shafts comprise a plate on which a single eccentric weight is fixed in radially spaced relation to the rotational axes of said half-speed shafts, and wherein said force producing means supported by said full-speed shafts comprise a plate on which dual fixed eccentric weights are fixed in equivalent radially spaced relation to the rotational axis of said full-speed shafts, and wherein said dual eccentric weights are spaced in angular relation, said dual eccentric weights each being of a mass equivalent to one half of the mass of said single eccentric weights supported by said half-speed shafts.

13. A vibratory conveyor as claimed in claim 11 wherein said force producing means on each vibratory shaft is a variable force member.

14. A vibratory conveyor as claimed in claim 13 wherein each variable force member comprises a fixed weight carried on one side of the axis of the shaft, a movable weight carried on the other side of the axis of the shaft, said movable weight being movable from one extreme position which neutralizes the unbalance of the fixed weight to another extreme position in consort with the fixed weight which maximizes the unbalance of the variable force member whereby the force of the force producing means can be adjusted to suit the conditions dictated by the material being conveyed 15. A vibratory conveyor as claimed in 12 wherein said vibrator shafts are at one instant synchronized such that said single eccentric weights of said half-speed shafts are positioned at 0 degrees with respect to the horizontal while said dual eccentric weights of said full-speed shafts are simultaneously and respectively positioned symmetrically with respect to the horizontal with the resulting force that is produced in that position being equal to a double force in one direction.

16. In a vibratory conveyor having an elongated horizontal trough with an inlet end and a discharge end, resilient means affixed to a support structure and to the trough for suspending said trough for only substantially horizontal motion, vibration generating means affixed to said trough intermediate the ends thereof, said vibration generating means comprising:
 a motor driving a motor shaft with at least one toothed pulley on said shaft;
 four vibrator shafts lying parallel to each other and to the motor shaft and extending transverse to the longitudinal axis of the trough, two of said shafts being half-speed shafts and having equal diametered toothed pulleys and equal weights offset equally from the axes of the shafts, the other two of said shafts being full-speed shafts and having equal diametered toothed pulleys, which diameters are one-half the diameter of the half-speed pulleys, said full-speed shafts having equal weights offset equally from the axes of said full-speed shafts;
 an idler shaft and toothed pulley extending transverse to the axis of the trough with the idler shaft lying parallel to the vibrator shafts and the motor shaft;
 a timing belt drivingly connected to one side of one of the half-speed pulleys and to the other side of the second of the half-speed pulleys, the timing belt drivingly connected to one side of one of the full-speed pulleys and then drivingly connected to the other side of the other of the full-speed pulleys, the four toothed pulleys being oriented such that at one instant of time in each revolution of the pulleys all weights on all four pulleys will be directed in one common direction along the axis of the trough for providing a double force along the trough, the timing belt will turn the half-speed pulleys in opposite directions whereby a 90° turn of the half-speed pulleys cancels the force of the half-speed pulleys and causes the two full-speed pulleys to rotate 180° for generating a single force in a direction along the trough opposite to the direction of the double force, another 90° turn of the half-speed pulleys rotates the full speed pulleys 360° from their initial position for producing a resultant force of 0 along the trough, a further 90° turn of the half-speed pulleys rotates the full-speed pulleys the equivalent of 180° from the initial position of the pulley for producing a single force in the direction opposite to the direction of the double force along the trough, and a final 90° turn of the half-speed pulleys rotates the full-speed pulleys 360° from the initial position of the pulleys for producing a double force in the same direction as the initial double force along the trough whereby material on the trough is shuffled in a horizontal plane toward the discharge end of the trough.

17. The vibratory conveyor of claim 14 wherein the weights of the vibration generating means are variable weights whereby at startup the unbalanced forces on each of the four weighted shafts is substantially equal to zero resulting in minimal loading on the motor and initially no vibratory motion along the trough.

18. A vibratory conveyor comprising:
 an elongated material-carrying member;
 means for supporting and constraining said material-carrying member for oscillatory movement substantially parallel to a fixed mounting structure;
 vibration generation means mounted above and below said material-carrying member intermediate the ends thereof for imparting vibratory forces to said material-carrying member and at a point selectable along the material-carrying member, said vibratory forces acting along a linear path directed exclusively within a plane defined by said material-carrying member and substantially parallel to said mounting structure, said forces thereby precluding components of motion perpendicular to said material-carrying member; and
 means for driving said vibration generating means.

19. The vibratory conveyor as claimed in claim 18 wherein said material-carrying member has an inclined orientation relative to the horizontal.

20. A vibratory comprising:
 an elongated material-carrying member;
 means for supportively mounting said material-carrying member for oscillatory movement substantially parallel to a mounting surface, said mounting means comprising a plurality of longitudinally spaced legs extending between said mounting surface and said material-carrying member at an angle of approximately 90° with the mounting surface, and wherein said mounting means resiliently tolerate substantially parallel movement of said material carrying member relative to said mounting surface while restricting substantially perpendicular movement of said material-carrying member relative to said mounting surface; and
 vibration generating means mounted on said material-carrying member intermediate the ends thereof for imparting horizontal vibratory forces to said material-carrying member, said vibration generating means being selectably mounted along the length of said material-carrying member, said vibration generating means comprising vibrator shafts located above and below the material-carrying member; and
 means for driving said vibration generating means.

* * * * *